United States Patent [19]

Solow

[11] Patent Number: 4,912,454
[45] Date of Patent: Mar. 27, 1990

[54] FLASHING LED SAFETY LIGHTS FOR DEMARCATING THE SIDES OF A VEHICLE

[75] Inventor: Joseph E. Solow, Plainview, N.Y.

[73] Assignee: Wolo Manufacturing Corp., Deer Park, N.Y.

[21] Appl. No.: 297,598

[22] Filed: Jan. 13, 1989

[51] Int. Cl.$^4$ .............................................. B60Q 1/00
[52] U.S. Cl. ...................................... 340/472; 315/77; 307/10.8
[58] Field of Search ............... 315/77, 80, 82, 134, 315/157, 159; 340/422, 469, 901, 905, 468; 307/10.8

[56] References Cited

U.S. PATENT DOCUMENTS

| | | |
|---|---|---|
| 2,813,265 | 11/1957 | Finks . |
| 2,918,565 | 12/1959 | Vermette . |
| 3,175,186 | 3/1965 | Barenyi . |
| 3,263,211 | 7/1966 | Heidman, Jr. . |
| 3,372,373 | 3/1968 | Heidman, Jr. . |
| 3,832,597 | 8/1974 | Mitchell ................................ 315/77 |
| 4,195,281 | 3/1980 | Bell ........................................ 315/82 |
| 4,249,160 | 2/1981 | Chilvers ................................ 315/82 |
| 4,695,769 | 9/1987 | Schweickardt ..................... 315/134 |
| 4,733,103 | 3/1988 | Itoh et al. ............................. 315/159 |

FOREIGN PATENT DOCUMENTS 2061489 5/1981 United Kingdom .

Primary Examiner—Joseph A. Orsino
Assistant Examiner—Frank M. Scutch, III
Attorney, Agent, or Firm—Brumbaugh, Graves, Donohue & Raymond

[57] ABSTRACT

A vehicle warning system is provided having a plurality of light emitting diodes mounted on a rearward facing portion of a housing, that may be attached to the side of the vehicle. A switching transistor selectively supplies current to the LED's, through a flashing circuit. The base of the transistor is driven by electrical connection to the junction of first and second phototransistors, which are mounted on the housing and directed skywardly and rearwardly, respectively. During the day the skywardly pointing phototransistor grounds the base of the transistor so that the LED's remain off. At night, the LED's are turned on responsive to the headlights of an oncoming vehicle, which will activate the rearwardly facing phototransistor.

13 Claims, 1 Drawing Sheet

FLASHING LED SAFETY LIGHTS FOR DEMARCATING THE SIDES OF A VEHICLE

BACKGROUND OF THE INVENTION

This invention relates to a vehicle safety light which provides a warning signal to approaching vehicles at night.

At night, vehicles parked on the street are subject to being side-swiped by passing vehicles, especially in inclement weather or when parked on a poorly lit side street. The risk to parked cars is especially prevalent at night, due to reduced visibility, from drivers who are inattentive or impaired. Accidents also occur on highways when an overtaking car misjudges the position of the side of the other car, as is more apt to happen at night, and swerves into it.

It is desirable then to have a means of indicating to the oncoming vehicles the position of the stationary vehicle. It has been suggested in the art, such as in U.S. Pat. No. 4,249,160 to Chilvers, to provide a vehicle light assembly responsive to oncoming incident light, such as headlights, which operates only at night when the vehicle is turned off. However, the methods suggested therein for detection of incident light and generation of responsive illumination have the drawback that they require comparison of the signal corresponding to the intensity of the incident luminance with a pre-determined threshold level which is difficult to set initially and maintain during use thereof. The efficiency and longevity of the power source are handicapped by the use of these comparison circuits because the devices that conventionally perform this operation, such as operational amplifiers, are considered to have high power consumptions. Therefore a need exists for a vehicle warning light which will operate at night in response to incident light and which is implemented by means of a simple, easily fabricated, low power consumption transistor circuit not dependent on threshold comparisons.

SUMMARY OF THE INVENTION

The present invention is a vehicle warning system having a plurality of light emitting elements, e.g. LED's mounted on a rearward facing portion of a housing that attaches to a vehicle. The light emitting elements are actuated by a detection circuit which is responsive to a combination of ambient light condition and the presence or absence of headlights of oncoming vehicles.

In a preferred embodiment, the detection circuit includes first and second phototransistors, aimed skywardly and rearwardly, respectively, coupled serially between a voltage source and ground. An NPN transistor is driven by electrical connection to the junction of the first and second phototransistors, for selectively supplying current from the voltage source to the LED's. During daylight the skyward phototransistor is on, so that the base of the NPN transistor is grounded and the LED's remain off. At night, with the skyward phototransistor off, the base of the NPN transistor will be driven responsive to the rearwardly facing phototransistor, so that headlights of oncoming cars will activate the LED's. Preferably, rather than feeding the NPN output directly to the LED's, the current output from the transistors is fed through an oscillator chip with a power boost circuit so that the LED's flash.

A warning light according to the invention is preferably mounted on the driver side of the vehicle, such that cars passing on the left, and cars passing while the car is parked, will activate the device at night. If desired, a second light may be mounted on the passenger side of the vehicle, to warn cars passing on the right. The provision of lights on both sides of the car offers additional safety for occasions when the car is parked on the left-hand side of the street (e.g. on one-way streets) or in open parking lots.

For a better understanding of the invention, reference is made to the following detailed description of the preferred embodiments taken in conjunction with the accompanying drawings.

DETAILED DESCRIPTION OF THE PREFERRED EMBODIMENTS

Figure 1:
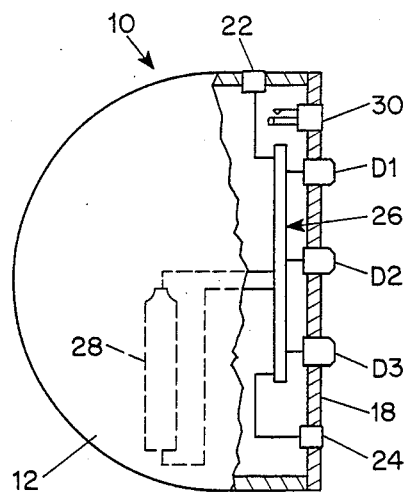
FIG. 1 is a side view, partially in section, of a vehicle warning light according to the present invention.
Figure 2:
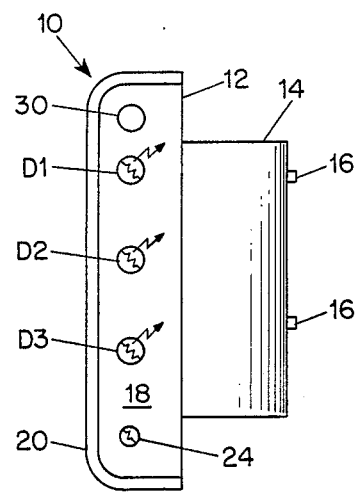
FIGS. 2 and 3 are rear and top views, respectively, of the warning light of FIG. 1.
Figure 3:
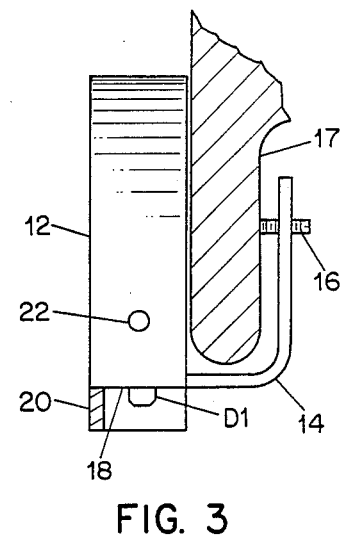

FIGS. 1-3 illustrate a warning light 10 which can be mounted on the side of an automobile or other vehicle, e.g. on the drivers side of the car. The warning light includes a housing 12 which can be attached to the vehicle by suitable mounting means. As shown in FIG. 3, a bracket 14 and set screws 16 may be used to attach the housing 12 to the vertical rear flange 17 of the car door. However other types of mounting hardware, either for attaching the housing 12 to the door, or for attaching the housing 12 to other parts of a vehicle (e.g. a fender or rear quarter panel) may be employed.

Light emitting diodes D1, D2 and D3 are mounted on a rearward facing plate 18 of housing 12. Plate 18 is preferably provided with a reflective surface, e.g. a reflective tape, to increase the visibility of the diodes D1–D3. A shielding band 20 extends rearwardly from the outside edge of the housing so that the LED's D1–D3 can be seen only from behind. Also provided on housing 12 are photosensitive elements 22 and 24, preferably phototransistors, which are oriented skywardly and rearwardly, respectively.

As shown in FIG. 1, Diodes D1–D3 can be mounted on a printed circuit board 26 disposed behind the plate 18, which also contains the driving and detection circuit described below. A battery 28 is disposed in housing 12 as a voltage source. Optionally, a jack 30 may be provided for connection to an external power supply such as the car cigarette lighter or vehicle wiring.

Figure 4:
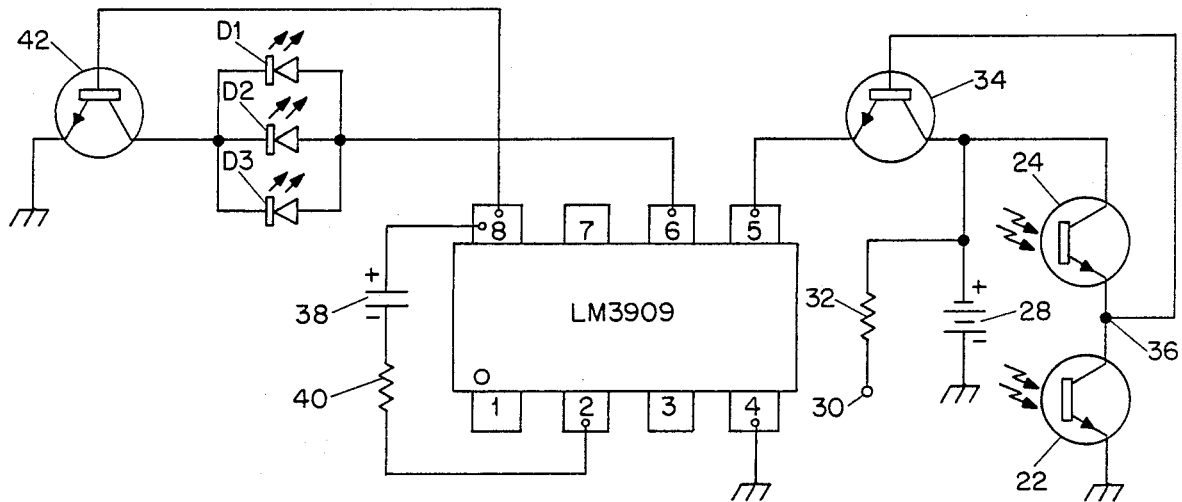
FIG. 4 is a circuit diagram of a detection and driving circuit for use in the warning light of the present invention.

With reference to FIG. 4, in the driving and detection circuit the rearwardly facing phototransistor 24 and skywardly facing phototransistor 22 are connected in series between the battery 28, which is a 3 volt source, and ground. The alternate voltage source, 12 volt jack 30, is also connected to the phototransistors 24, 22 via a voltage reducing resistor 32.

Voltage source 28, 30 is also connected to the input of an NPN transistor 34. The base of the transistor 34 is connected to the junction 36 between phototransistors 22, 24.

The output of NPN transistor 34 is connected to the LED's, preferably through an oscillating circuit. A suitable oscillating circuit can be provided by monolithic oscillator, such as model LM3909, which is a well known chip designed to flash LED diodes. Other such flashing chips are well known and may be used for such purpose.

In the case of a LM3909 chip, pin 5 is the power feed, pin 4 is the ground lead, and pin 8 produces an oscillating output. LED's D1-D3 may be connected directly to pin 8, but for reasons discussed below it is preferable to employ the circuit of FIG. 4

As shown in FIG. 4, pin 8 is connected, by way of a feedback loop, to pin 2 through a capacitor 38 and resistor 40. The size of capacitor 38 may be selected to establish the flash rate. The LED's D1-D3 are connected to power output pin 6 of LM3909 and, through switching NPN transistor 42, to ground. The base o transistor 42 is, in turn, driven by the oscillating output of pin 8.

The operation of the aforedescribed safety light is as follows. During the day, ambient light activates both photosensitive elements 22 and 24 causing a decrease in the resistance of the elements. Since photosensitive element 22 is in its low resistivity state, the base of NPN transistor 34 is grounded and transistor 34 is off. Thus LED's D1-D3 remain off in daylight. It should be noted that although both phototransistors 22, 24 are in their low resistivity states, the resistance through elements 22, 24 is still sufficiently high so as to cause very little voltage drain on power source 28, e.g., o the order of only 10-14 microamperes.

At night, when no vehicle is approaching, both photosensitive elements 22 and 24 retain high resistance characteristics, and once again transistor 34 remains off.

When a vehicle approaches from the rear, light from its headlights hits the rearwardly facing photosensitive element 24 causing its resistance to decrease. Because upwardly facing phototransistor 22 remains at its high resistivity (due to lack of incident light), positive voltage is applied to the base of transistor 34, turning it on.

When transistor 34 turns on, voltage from power source 28 or 30 is supplied to the power feed pin 5 of oscillating chip LM3909, which causes pin 8 to emit an oscillating output to transistor 42 causing LED's D1-D3 to flash. This will alert the oncoming driver to the presence of the car.

Capacitor 38 is preferably approximately a 6 volt condenser. When pin 8 discharges, the condenser gives the LED's a boost, similar to a power flasher, so that light output is brighter. The LED's can also be connected directly to pin 8 and will flash, but without the power boost.

The light 10 is shown with a penlight battery 28 as its on-board power source. The jack 30 may be used to connect the circuit to the car battery, for overnight use, to prolong the battery life. Alternately, the light may contain any known recharging circuit, and the jack used to recharge the battery.

Figure 5:
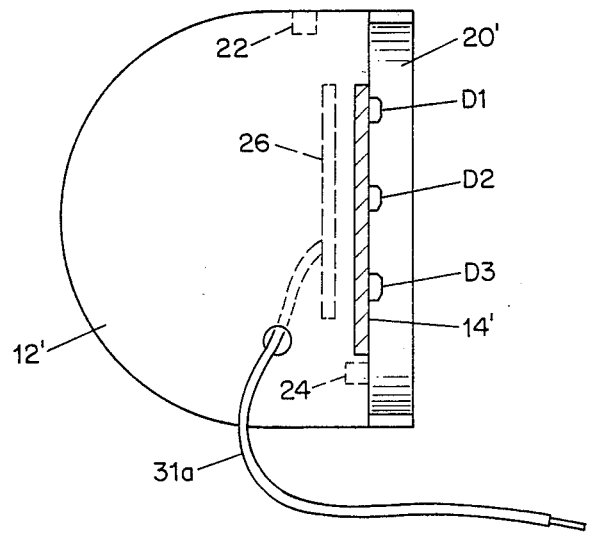
FIG. 5 is a side view, looking from the reverse side of FIG. 1, of an alternative embodiment of a warning light.

FIG. 5 shows an alternative embodiment, which is the same as FIGS. 1-4 except that the housing is arranged for the passenger side of the car, and a lead wire 31a, which can be readily connected to the vehicle battery wiring system, provides power, through resistor 32, to the circuit. In this embodiment, the battery 28 and jack 30 are both eliminated.

Preferably, warning light are mounted on either side of the vehicle. The lights may be attached to the door, to a side panel or bumper, or to any other location. The embodiment of FIGS. 1-4, with a self-contained battery, is readily mountable with a bracket, or if desired by screws or the like to the vehicle body. The embodiment of FIG. 5, which requires attaching the power wire to the vehicle wiring system, takes slightly more effort to install, but has the advantage that an on-board power source is not required, nor is there a need to replace or recharge the batteries.

The detailed description of the preferred embodiment of the invention having been set forth herein for the purpose of explaining the principles thereof, it is known that there may be modifications, variation or change in the invention without departing from the proper scope of the invention and the claims thereto.

I claim:

1. A light responsive vehicle warning system comprising:
   a housing;
   means for attaching said housing to a vehicle;
   a plurality of light emitting elements supported by said housing;
   a voltage source providing means;
   first and second photosensitive elements having means, actuated responsive to light, for changing from a high resistance state to a lower resistance state, said elements being mounted on said housing for facing skyward and rearward, respectively;
   first circuit means for serially connecting said first and second photosensitive elements between said voltage source providing means and ground;
   switching means having an input and output, and a base for selectively conducting current from said input to said output responsive to an applied voltage;
   second circuit means connected at a junction of said first and second photosensitive elements for connecting said junction to the base of said switching means, for selectively applying voltage to said base;
   third circuit means for connecting said voltage source providing means to the input of said switching means; and
   fourth circuit means coupled to the output of said switching means for activating said light emitting elements; whereby during daylight said first and second photosensitive elements are in said lower resistance state and said switching means is off; and whereby at night said first photosensitive element is in said higher resistance state and said switching means, and thereby said light emitting elements, are turned on responsive to incident light on said second photosensitive element.

2. The vehicle warning system according to claim 1, wherein said plurality of light emitting elements are light emitting diodes (LED's).

3. The vehicle warning system according to claim 2, wherein said photosensitive elements are phototransistors.

4. The vehicle warning system according to claim 3, wherein said switching means is an NPN type transistor.

5. The vehicle warning system according to claim 4, wherein said fourth circuit means comprises integrated circuit means for producing a first, oscillating output for flashing said LED's.

6. The vehicle warning system according to claim 5, wherein said integrated circuit means includes a second output and means for providing a power boost to said second output; and wherein said fourth circuit means comprises means for connecting said LED's to said second output, a second NPN transistor, having a base, connected between said LED's and ground, and means for connecting said first output to the base of said second NPN transistor.

7. The vehicle warning system according to claim 6, wherein said rearward facing portion of said housing has a reflective surface.

8. The vehicle warning system according to claim 6, wherein said voltage source providing means comprises a battery and said housing further includes means for holding said battery.

9. The vehicle warning system according to claim 8, wherein said voltage source providing means comprises jack means on said housing for connection to a second voltage supply.

10. The vehicle warning system according to claim 1, wherein said voltage source providing means comprises a lead wire extending out of said housing and being connectable to the existing vehicle battery circuit.

11. A light responsive warning system, comprising:
a warning apparatus;
a photosensitive circuit comprising a first photosensitive element oriented to respond to ambient light and a second photosensitive element oriented to receive light from an approaching vehicle, said circuit being arranged to provide a first output signal when said second photosensitive element detects light from an approaching vehicle and said first photosensitive does not detect ambient light and to provide a second output signal when said first photosensitive element detects ambient light and to provide said second output signal when said second photosensitive element does not detect light from an approaching vehicle;
and a switching circuit, responsive to said first output signal of said photosensitive circuit to activate said warning apparatus and responsive to said second output signal to de-activate said warning apparatus.

12. A light responsive warning system as specified in claim 11 wherein said first and second photosensitive elements comprise series connected phototransistors, and wherein said first and second output signals are provided at the junction between said series connected phototransistors.

13. A light responsive vehicle warning system as specified in claim 11 wherein said warning apparatus comprises at least one warning light.

* * * * *